US007739268B2

(12) United States Patent
Cunningham et al.

(10) Patent No.: US 7,739,268 B2
(45) Date of Patent: Jun. 15, 2010

(54) OPTIMIZATION OF PERFORMING QUERY COMPILATIONS

(75) Inventors: Conor J. Cunningham, Bothell, WA (US); Stanislav A. Oks, Kirkland, WA (US); Stefano Stefani, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 870 days.

(21) Appl. No.: 11/392,267

(22) Filed: Mar. 29, 2006

(65) Prior Publication Data

US 2007/0239658 A1    Oct. 11, 2007

(51) Int. Cl.
G06F 7/00 (2006.01)
G06F 17/30 (2006.01)
G06F 13/00 (2006.01)
G06F 13/28 (2006.01)

(52) U.S. Cl. .................. 707/718; 707/719; 711/170; 711/173

(58) Field of Classification Search .............. None
See application file for complete search history.

(56) References Cited

U.S. PATENT DOCUMENTS

| | | | | | |
|---|---|---|---|---|---|
| 5,758,149 | A | * | 5/1998 | Bierma et al. ................ | 707/8 |
| 7,281,004 | B2 | * | 10/2007 | Lightstone et al. ........... | 707/4 |
| 2003/0158842 | A1 | * | 8/2003 | Levy et al. .................. | 707/3 |
| 2003/0212699 | A1 | * | 11/2003 | Denesuk et al. ............ | 707/102 |
| 2004/0073549 | A1 | * | 4/2004 | Turkel et al. ................ | 707/5 |
| 2005/0192978 | A1 | * | 9/2005 | Lightstone et al. .......... | 707/100 |
| 2006/0294079 | A1 | * | 12/2006 | Dettinger et al. ............ | 707/3 |
| 2007/0078829 | A1 | * | 4/2007 | Stern et al. ................. | 707/3 |

OTHER PUBLICATIONS

Adali et al. "Query Caching and Optimization in Distributed Mediator systems" Proceding of Sigomd 1996 Conference on Management of Data, pp. 137-148.*

Mehta et al. "Dynamic Memory allocation for Multiple-Query Workloads" Computer Science Department, University of Wisconsin-Madison, Dec. 11, 2000.*

* cited by examiner

*Primary Examiner*—Pierre M Vital
*Assistant Examiner*—Berhanu Mitiku

(57) ABSTRACT

Implementations of various technologies for compiling a query. In one implementation, the memory consumption of the query may be monitored. If the amount of memory consumed by the query exceeds one or more gateway thresholds, then the query may be processed to acquire one or more gateways. The query may then be compiled as having acquired the one or more gateways.

20 Claims, 3 Drawing Sheets

OPTIMIZATION OF PERFORMING QUERY COMPILATIONS

BACKGROUND

Modern commercial database systems contain query processors that can answer questions over data. These questions or queries are typically expressed in a query language, such as Structured Query Language (SQL). Processing a query generally involves a compilation step, where the request language is translated into an execution plan, and an execution step where the execution plan is executed and the desired results are returned. Often times, several overlapping queries are simultaneously sent to the database system, which may lead to an overall increase of the memory used for compilation and execution in memory consumption during compilation and execution. Concurrent execution of query execution plans may optimally require more resources than are available to the database system. Hence, attempting to run too many connections through the database system at once may damage the overall system throughput performance and cause non-graceful degradation in service to clients through poor allocation decisions for resources such as memory, disk space, or locks.

SUMMARY

Described here are implementations of various technologies for compiling a query. In one implementation, the memory consumption of the query may be monitored. If the amount of memory consumed by the query exceeds one or more gateway thresholds, then the query may be processed to acquire one or more gateways. The query may then be compiled as having acquired the one or more gateways.

In another implementation, the memory consumption of the query may be monitored. If the amount of memory consumed by the query exceeds a first gateway threshold, then the query may be processed to acquire a first gateway. If the query acquired the first gateway before a first gateway throttling time expires, the query may then be compiled as having acquired the first gateway. If the query is throttled past the first gateway throttling time, then a time out error message may be sent.

In yet another implementation, memory consumption of a first compilation of a query may be monitored. If the compilation of the query exceeds a first gateway threshold, then the first gateway for the query may be acquired. After having acquired the first gateway, memory consumption of a second compilation of the query may then be monitored. If the second compilation of the query exceeds a second gateway threshold, a second gateway for the query may then be acquired. After having acquired the second gateway, memory consumption of a third compilation of the query may then be monitored. If the third compilation of the query exceeds a third gateway threshold, then a third gateway for the query may be acquired.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

DETAILED DESCRIPTION

Figure 1:
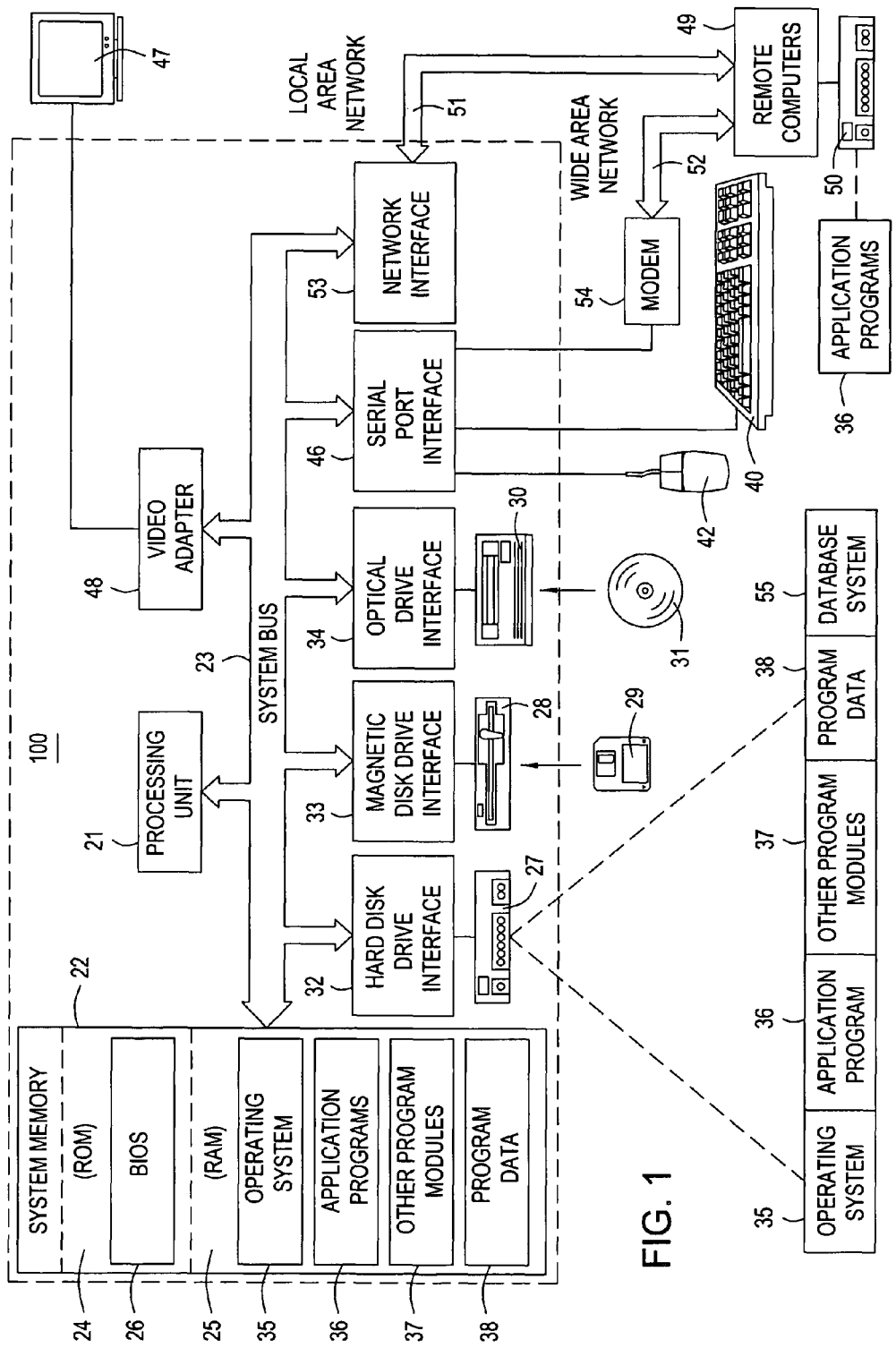
FIG. 1 illustrates a schematic diagram of a computing system in which various technologies described herein may be incorporated and practiced.

FIG. 1 illustrates a schematic diagram of a computing system 100 in which various technologies described herein may be incorporated and practiced. The computing system 100 may be a conventional desktop or a server computer. However, those skilled in the art will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, mini-computers, mainframe computers, and the like. Some implementations may be practiced in distributed computing environments where tasks are performed by local and remote processing devices that are linked through a communications network, e.g., by hardwired links, wireless links, or combinations thereof. In a distributed computing environment, program modules may be located in both local and remote memory storage devices.

Referring back to FIG. 1, the computing system 100 may include a central processing unit (CPU) 21, a system memory 22 and a system bus 23 that couples various system components including the system memory 22 to the CPU 21. The system bus 23 may be any of several types of bus structures, including a memory bus or memory controller, a peripheral bus, and a local bus using any of a variety of bus architectures. The system memory 22 may include a read only memory (ROM) 24 and a random access memory (RAM) 25. A basic input/output system (BIOS) 26, containing the basic routines that help transfer information between elements within the computing system 100, such as during start-up, may be stored in the ROM 24. Although only one CPU is illustrated in FIG. 1, it should be understood that in some implementations the computing system 100 may include more than one CPU.

The computing system 100 may further include a hard disk drive 27 for reading from and writing to a hard disk, a magnetic disk drive 28 for reading from or writing to a removable magnetic disk 29 and an optical disk drive 30 for reading from or writing to a removable optical disk 31, such as a CD ROM or other optical media. The hard disk drive 27, the magnetic disk drive 28, and the optical disk drive 30 may be connected to the system bus 23 by a hard disk drive interface 32, a magnetic disk drive interface 33, and an optical drive interface 34, respectively. The drives and their associated computer-readable media may provide nonvolatile storage of computer-readable instructions, data structures, program modules and other data for the computing system 100. Although the computing system 100 is described herein as having a hard disk, a removable magnetic disk 29 and a removable optical disk 31, it should be appreciated by those skilled in the art that the computing system 100 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 100.

A number of program modules may be stored on the hard disk, magnetic disk 29, optical disk 31, ROM 24 or RAM 25, including an operating system 35, one or more application programs 36, other program modules 37, a program data 38 and a database system 55. The operating system 35 may be any suitable operating system that may control the operation of a networked personal or server computer, such as Windows® XP, Mac OS® X, Unix-variants (e.g., Linux® and BSD®), and the like.

A user may enter commands and information into the computing system 100 through input devices such as a keyboard 40 and pointing device 42. Other input devices may include a microphone, joystick, game pad, satellite dish, scanner, or the like. These and other input devices may be connected to the CPU 21 through a serial port interface 46 coupled to system bus 23, but may be connected by other interfaces, such as a parallel port, game port or a universal serial bus (USB). A monitor 47 or other type of display device may also be connected to system bus 23 via an interface, such as a video adapter 48. In addition to the monitor 47, the computing system 100 may further include other peripheral output devices, such as speakers and printers.

The computing system 100 may operate in a networked environment using logical connections to one or more remote computers, such as a remote computer 49. The remote computer 49 may be another personal computer, a server, a router, a network PC, a peer device or other common network node, and may include many or all of the elements described above relative to the computing system 100, although the remote computer 49 is illustrated as having only a memory storage device 50. The logical connections may be any connection that is commonplace in offices, enterprise-wide computer networks, intranets, and the Internet, such as local area network (LAN) 51 and a wide area network (WAN) 52.

When using a LAN networking environment, the computing system 100 may be connected to the local network 51 through a network interface or adapter 53. When used in a WAN networking environment, the computing system 100 may include a modem 54 or other means for establishing communication over wide area network 52, such as the Internet. The modem 54, which may be internal or external, may be connected to the system bus 23 via the serial port interface 46. In a networked environment, program modules depicted relative to the computing system 100, or portions thereof, may be stored in a remote memory storage device 50. It will be appreciated that the network connections shown are exemplary and other means of establishing a communications link between the computers may be used.

Figure 2:
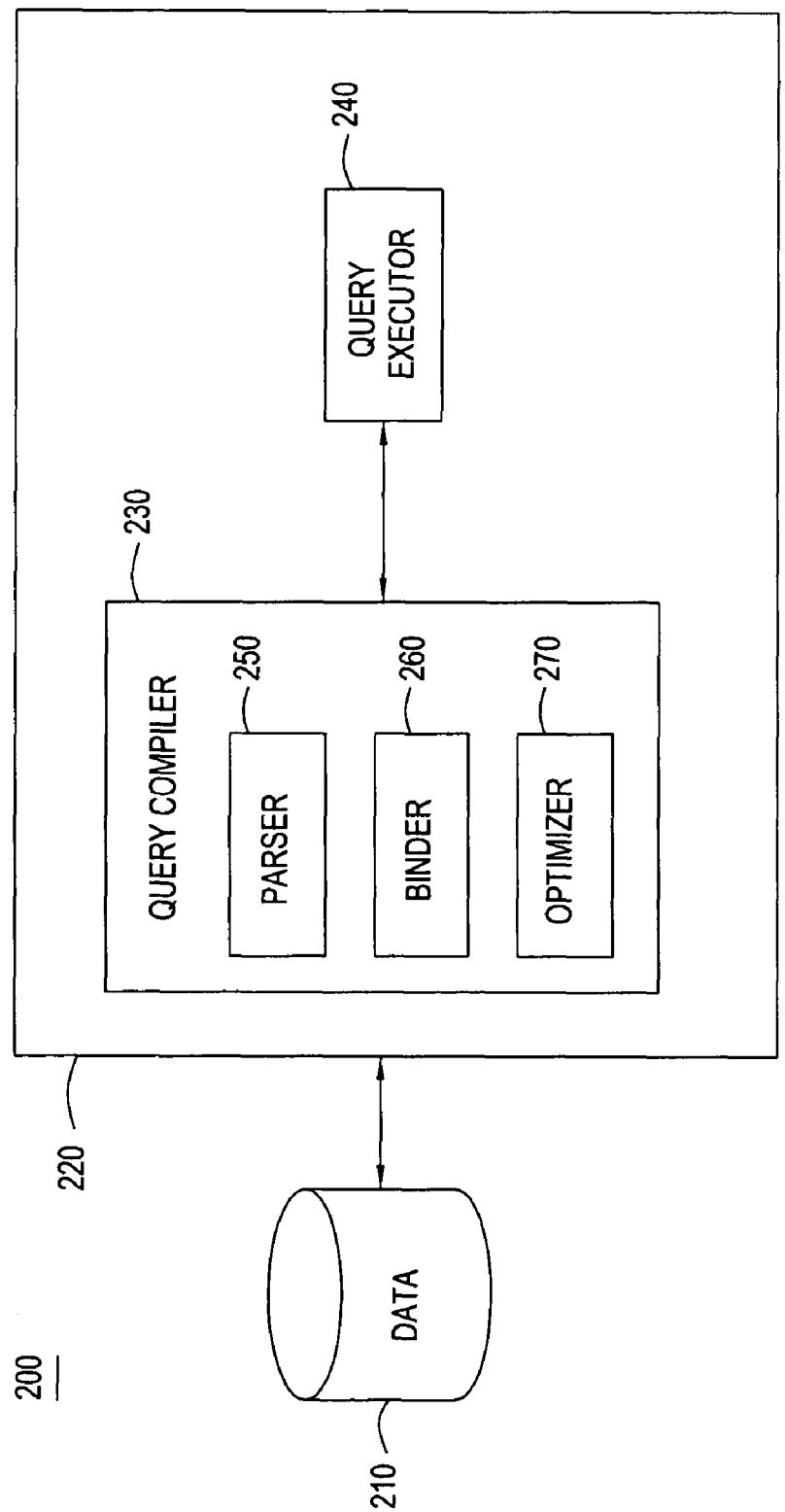
FIG. 2 illustrates a schematic diagram of a computer database system in accordance with implementations of various technologies described herein.

FIG. 2 illustrates a schematic diagram of a computer database system 200 in accordance with implementations of various technologies described herein. In one implementation, the database system 200 may include a database 210 and a database server 220. The database system 200 may be resident on the computing system 100 or may be remotely located from the computing system 100, such as the remote computer 49. The database system 200 may be configured to manage the storage and retrieval of data in the database 210 in accordance with data manipulation statements or queries presented to the database system 200 by a database application or by a user.

The database 210 may include a plurality of tables of data. Each table may include a set of records of data stored in one or more data fields.

The database server 220 may be configured to process queries, such as, to retrieve, insert, delete, and/or modify data in the database 210. A user query typically includes a selection of data from the database. For example, a simple user query may inquire about how many records fall between the values represented by certain endpoints, designated RANGE-HIGH and RANGELOW. Other, more complicated queries may involve joins of numerous attributes, and even more complicated queries may have simple selection queries imbedded within them. The database system 200 may support any suitable query language, such as Structured Query Language (SQL), to define the queries that may be processed by the database server 220.

The database server 220 may include a query compiler 230 and a query executor 240. The query compiler 230 may be configured to translate the query to a query execution plan. The query executor 240 may be configured to execute the query execution plan and return a set of results, which are desired by the query. The query compiler 230 may include a parser 250, a binder 260 and an optimizer 270. The parser 250 may be configured to analyze text statements in the query and break it into query trees. As such, the amount of memory consumed by the parser 250 is primarily influenced by the amount, size and complexity of text statements that are being processed. The binder 260 may be configured to analyze and validate the query trees. As such, the amount of memory consumed by the binder 260 is primarily influenced by the complexity of the query trees. The optimizer 270 may be configured to determine a query plan to extract the desired data from the database 210 and construct the query plan. The optimizer 270 may use database statistics, such as statistics on tables and indexes, to construct a query plan that is input/output (I/O) efficient. I/O efficiency is desirable because query results can be more quickly obtained if they are obtained using a plan that requires the fewest I/O accesses and that favors sequential I/O accesses over random I/O accesses. The optimizer 270 may formulate multiple query options and compare them against each other to determine the most I/O efficient plan. The amount of memory consumed by the optimizer 270 is primarily a by-product of how many query options are formulated. Although the query compiler 230 is described as having the parser 250, the binder 260 and the optimizer 270, it should be understood that in some implementations the query compiler 230 may include other components, such as a batch look up, a bath parser, a query execution plan look up and the like.

Memory is a precious resource that may have a significant impact on the performance of the database system 200. Commercial database systems typically devote memory to cache database pages to minimize disk input (I/O). Query execution efficiency may be greatly improved if operations are performed in memory, rather than on disk. In addition, efficiently managing the memory consumed by concurrent query compilations may improve the overall health and performance of the database system 200, since it would leave more memory available for the remaining components in the database system 200.

The amount of memory used by query compilations may be hard to predict and usually grows over time, as multiple alternative query plans are considered. As such, implementations of various technologies described herein are about limiting the number and/or progress of concurrent compilations occurring in the database system 200 such that the query compiler 230 may gracefully coexist with other memory-consuming components in the database system 200 and such that the overall system efficiency and performance may be maximized. In one implementation, the amount of memory consumed by an individual query compilation may be periodically and dynamically monitored. In another implementation, the amount of memory consumed by all concurrent compilations may be periodically and dynamically monitored. In yet another implementation, the amount of memory consumed by other memory-sensitive components in the database system 200 may be periodically and dynamically monitored. In still another implementation, the amount of overall memory available to the database system 200 may be periodically and dynamically monitored. In still yet another implementation, the database system 200 may be configured to adjust its behavior based on the above mentioned monitoring implementations and manage to maximize the query compilation throughput without compromising the overall system health.

In accordance with one implementation, query compilations may be divided into separate categories, e.g., according to the amount of memory being consumed. As a query is being compiled, i.e., as the trees are parsed and bound, and as the optimizer 270 considers possible alternative plans for the query, the amount of memory being consumed will increase, eventually causing the query compilation to migrate from one category to another. Overall memory consumption caused by memory compilations may be controlled and limited by capping the maximum number of concurrent compilations that can belong to a certain category. The higher the memory consumption, the lower will be the number of concurrent compilations that would be allowed in the corresponding category.

In one implementation, the access to a category may be implemented through a semaphore or gateway, which may be defined as a primitive computer construct that allows two concurrent tasks or processes to synchronize their logic. Effectively, it's a way for two pieces of code to talk to each other. One very common use of a semaphore is to provide mutual exclusion to a piece of code. A semaphore or gateway may also be used to limit the number of threads running at once, e.g., to limit the number of compilations running at a time. In one implementation, a gateway may be defined by the threshold of memory that must be consumed prior to acquiring the gateway, i.e., by the amount of memory that must be consumed in order to belong to that category of query compilations and by the number of concurrent compilations allowed in that category. As memory consumption increases, the number of concurrent compilations allowed by the corresponding gateway decreases. When a query compilation tries to acquire a gateway without available slots, it may have to wait until one or more such slots are released. A slot may be released when another query compilation completes and releases the memory it consumes to produce its output, i.e., the query plan. A slot may also be released when a query compilation releases enough memory previously required for some intermediate processing and moves back from a higher category and gateway to a lower category.

Gateways may also be defined by a timeout, i.e., the maximum amount of time a query compilation can wait in line for a slot to open. When the timeout expires, the query compilation may be aborted and the resources, i.e., memory, it had previously acquired may be released. Timeouts typically occur when the system is overloaded with concurrent requests. As such, it may be desirable to release some of the currently allocated memory resources to improve the overall health. As the gateway memory thresholds increase, the compilation times for the queries belonging to that category may also increase, and so does the corresponding timeout.

In one implementation, the number of gateways is three, which means that query compilations may be divided in four possible categories. Any number of queries may belong to the first category. Such queries have not acquired any gateway since the amount of consumed memory is lower than the first threshold. The second category may be configured to allow at most four times the number of CPUs present in the system. The third category may be configured to allow at most one compilation per CPU. The fourth and final category may be configured to allow only one compilation per system. The justification for tying the limits for some of the gateways to the number of CPUs is that query compilations are CPU-bound operations, and as such, allowing too many to share the same fully loaded processor at the same time may not yield any performance benefit. The justification for the final gateway is to allow one extremely complex compilation to use as many resources as the system allows without competing with another complex compilation occurring at the same time.

The memory thresholds for the gateways may be either static or dynamically computed based on the current system load and overall memory consumption. In one implementation, the memory threshold for the first gateway may be static and defined as the amount of memory required to compile simple diagnostic queries that are typically executed to diagnose overloaded or irresponsive servers. In another implementation, the first gateway threshold may be configured to provide a sufficient amount of memory to process only those queries that will be processed by the parser 250 or that result in a successful plan cache lookup, with no binding or optimization involved. This static threshold may be processor architecture dependent. Subsequent gateway thresholds may be dynamically and periodically computed based on the amount and rate of memory being consumed by all of the compilations running in the system. When there is little activity, i.e., little memory consumption, in the system, this implementation may allow concurrent compilations to consume a significant amount of memory and processing resources, thereby maximizing the number of query plans produced over a given period of time. As the system load increases, the gateways may react by lowering their thresholds, effectively forcing query compilations to move to higher categories that allow a lower concurrent number. On an extremely clogged system, the thresholds may drop to such a low value that all non trivial, diagnostic style compilations may be forced to acquire the last gateway, thereby effectively only allowing one query compilation on the entire system and minimizing the overall amount of memory required by the query compiler.

In one implementation, the amount of memory consumed by a query compilation may be periodically monitored and compared with the gateway threshold. If either the memory consumed by the query compilation has increased or the threshold has lowered since the last check, then an attempt to acquire the gateway may be performed. If insufficient slots are available, then the compilation may be put on hold until the timeout expires and subsequently aborted.

Figure 3:
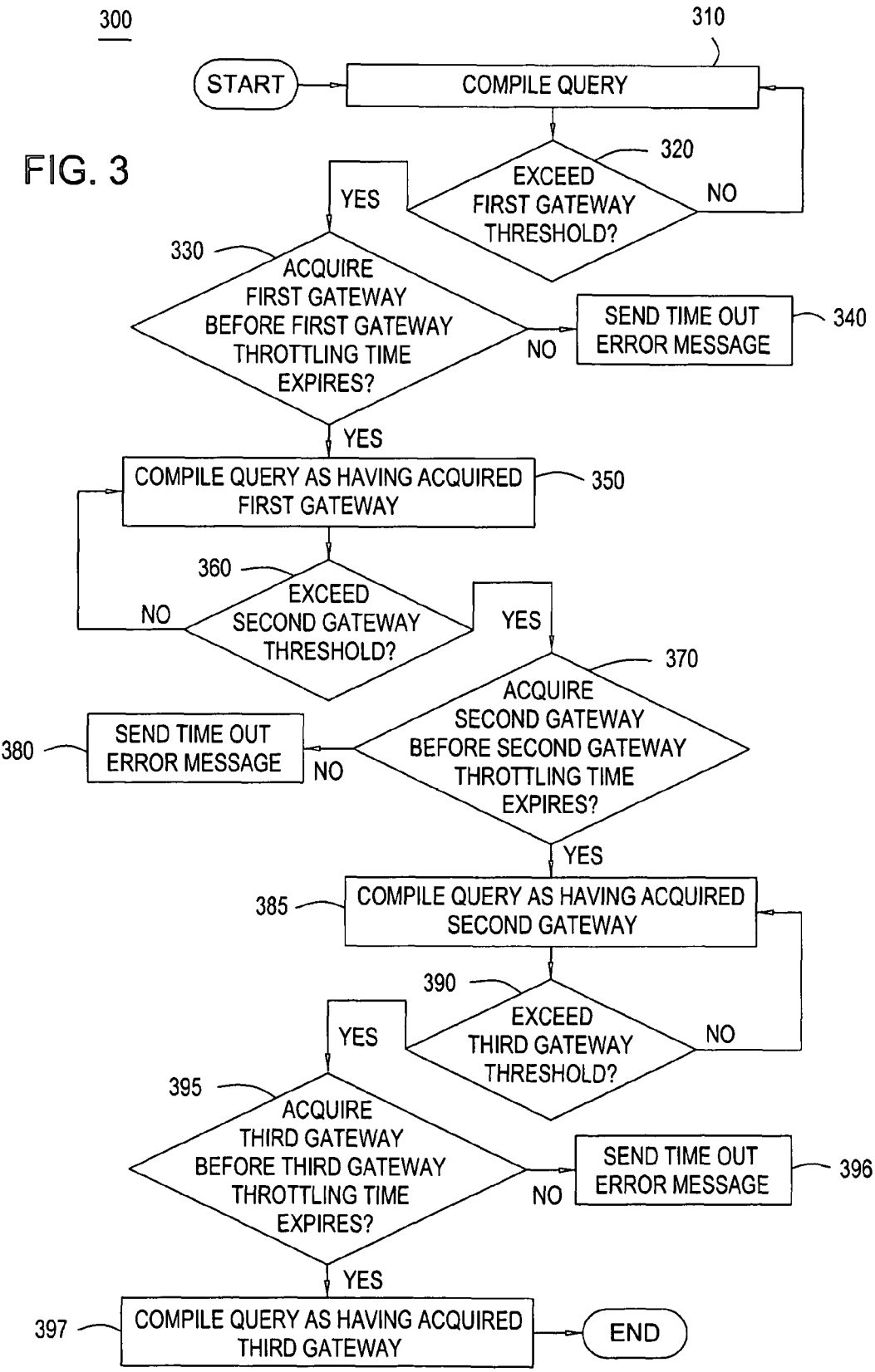
FIG. 3 illustrates a flow diagram of a method for compiling a query in accordance with one or more implementations of various technologies described herein.

The following paragraphs describe one or more of the above mentioned implementations. FIG. 3 illustrates a flow diagram of a method 300 for compiling a query in accordance with one or more implementations of various technologies described herein. As each query is processed by the query compiler 230 (block 310), a determination may be made as to whether the amount of memory consumed by the query compiler 230 to process the query exceeds a first gateway threshold (block 320). As mentioned above, the first gateway threshold may be defined as the amount of memory required to compile simple diagnostic queries that are typically executed to diagnose overloaded or irresponsive servers.

If the amount of memory consumed by the query is determined to exceed the first gateway threshold, then the query may be processed to acquire a first gateway or semaphore (block 330). In one implementation, the number of queries having acquired the first gateway may be limited to four queries (or compilations) per CPU. As such, if there are already four queries per CPU having acquired the first gateway, then the query in process may be throttled, i.e., placed on a waiting queue, until one of the four queries having the first gateway completes its compilation process and releases a corresponding portion of memory that it consumes. In one implementation, the query may only be throttled for a predetermined time period, which may be referred to as the first gateway throttling time. For example, the first gateway throttling time may be six minutes. If the time during which the query is throttled exceeds the first gateway throttling time, then a time out error message may be returned to the sender of the query (block 340). However, if one of the four queries having the first gateway completes its compilation while the query is being throttled, then the query will acquire the first gateway. The query may also acquire the first gateway without throttling so long as there is room for the query to be processed as one of the four queries per CPU. Once the query acquires the first gateway, then the query is compiled as one of the four queries per CPU having the first gateway (block 350). In this manner, the first gateway may be configured to prevent an arbitrary number of CPU intensive operations from occurring at the same time.

As the query is being compiled as having acquired the first gateway, a determination is made as to whether the amount of memory consumed by the query compiler 230 to process the query exceeds a second gateway threshold (block 360). In one implementation, the second gateway threshold may be defined as ([available addressable memory]−[memory currently consumed by other components, e.g., query execution])/([threshold factor]*[current number of compilations belonging to the second category, i.e., compilations that have crossed the first gateway threshold but not the second]). For example, with a threshold factor of 10, on a machine with 1 gigabyte of RAM, 2 CPUs and no concurrent query executions, the threshold would be 1 GB/(10*[queries in the second category])=100 megabytes/[queries in the second category]. In other words, on such a machine, without outstanding memory consuming query executions, query compilations belonging to the second category may at most allocate up to 100 megabytes overall before acquiring the second gateway and moving to the third category. Since there can be at most 4*2 CPUs=8 queries belonging to the second category, the lowest value for the threshold may be 100 megabytes/8=12.5 megabytes. In presence of other operations consuming memory on the system, the threshold value may decrease accordingly.

If the amount of memory consumed by the query is determined as exceeding the second gateway threshold, then the query may be processed to acquire the second gateway (block 370). In one implementation, the number of queries having acquired the second gateway may be limited to only one query compilation per CPU. As such, if there is already one query per CPU being processed as having acquired the second gateway, then the query in process may be throttled until a slot is available for the query to acquire the second gateway. In one implementation, as with the first gateway, the query may only be throttled for a predetermined time period, which may be referred to as the second throttling time. In one implementation, the second gateway throttling time is longer than the first gateway throttling time, e.g., four times as long as the first gateway throttling time. If the time during which the query is throttled exceeds the second gateway throttling time, then a time out error message may be returned to the sender of the query (block 380). On the other hand, if a slot opens for the query in process to acquire the second gateway before the second gateway throttling time expires, the query may then acquire the second gateway (block 385). In this manner, the second gateway may be configured to prevent a significant number of concurrent query optimizations from stealing the majority of pages from the buffer pool.

As the query is being compiled as having acquired the second gateway, a determination is made as to whether the amount of memory consumed by the query compiler 230 to process the query exceeds a third gateway threshold (block 390). In one implementation, the third gateway threshold may be defined as ([available addressable memory]−[memory currently consumed by other components, e.g., query execution])/([threshold factor]*[current number of compilations belonging to the third category, i.e., that have crossed the second gateway threshold but not the third]). For example, with a threshold factor of 5, on a machine with 1 gigabyte of RAM, 2 CPUs and no concurrent query executions, the threshold may be 1 GB/(5*[queries in the third category])=200 megabytes/[queries in the third category]. In other words, on such a machine, without outstanding memory consuming query executions, query compilations belonging to the third category may at most allocate up to 200 megabytes overall before acquiring the third gateway and moving to the fourth and last category. Since there can be at most 1*2 CPUs=2 queries belonging to the third category, the lowest value for the threshold may be 200 megabytes/2=100 megabytes. In presence of other operations consuming memory on the system, the threshold value may decrease accordingly.

If the amount of memory consumed by the query is determined as exceeding the third gateway threshold, then the query may be processed to acquire the third gateway (block 395). In one implementation, the number of queries having acquired the third gateway may be limited to only one query compilation per database system. As such, if there is already one query per database system processed as having acquired the third gateway, then the query in process may be throttled until a slot is available for the query to acquire the third gateway. In one implementation, as with the first gateway and second gateway, the query may only be throttled for a predetermined time period, which may be referred to as the third throttling time. In one implementation, the third gateway throttling time may be defined as a function of the first gateway throttling time, e.g., (6+CPUs/8)*first gateway throttling time. If the time during which the query is throttled exceeds the third gateway throttling time, then a time out error message may be returned to the sender of the query (block 396). On the other hand, if a slot is available for the query in process to acquire the third gateway before the third gateway throttling time expires, then the query will acquire the third gateway and the query will be processed as having acquired the third gateway (block 397). At any time during memory allocation, if the amount of memory needed to compile the queries exceeds the amount of available memory, then an out of memory message may be returned to the sender of the queries.

In one implementation, the compilation process illustrated by method 300 may be performed by the optimizer 270. However, it should be understood that in some implementations the compilation process illustrated by method 300 may be performed by any component or subcomponent of the query compiler 230, including the parser 250, the binder 260, a batch look up, a bath parser, a query execution plan look up and the like.

In another implementation, the compilation process illustrated by method 300 may dynamically vary in response to increase or decrease in memory consumption by other components or subcomponents in the database system 55. For example, a query may be processed by the optimizer 270 as having acquired a second gateway. However, at the same time, the binder 260 is processing a large tree, which consumes a lot of memory. Consequently, the query having acquired the second gateway may be required to acquire a third gateway in response to a decrease in available memory in the system.

In this manner, implementations of various technologies described herein may be used to throttle query compilations based on memory consumption. As a result, throughput of the database system 200 may be increased and resource exhaustion during query compilation and execution may be minimized.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for compiling a query, comprising:
   monitoring memory consumption of a first compilation of the query;
   acquiring a first gateway for the query if the memory consumption of the first compilation exceeds a first gateway threshold and the first gateway is available, wherein the first gateway is available if a number of queries as having acquired the first gateway is less than four queries per CPU;
   throttling the query if the memory consumption of the first compilation exceeds the first gateway threshold and the first gateway is not available;
   monitoring memory consumption of a second compilation of the query after having acquired the first gateway;
   acquiring a second gateway for the query if the memory consumption of the second compilation of the query exceeds a second gateway threshold and the second gateway is available, wherein the second gateway is available if a number of queries as having acquired the second gateway is less than one query per CPU; and
   throttling the query if the memory consumption of the second compilation exceeds the second gateway threshold and the second gateway is not available.

2. The method of claim 1, wherein a number of queries as having acquired the first gateway is limited to four queries per CPU.

3. The method of claim 2, wherein the first gateway is not available if four queries per CPU have acquired the first gateway.

4. The method of claim 1, wherein a number of queries as having acquired the second gateway is limited to one query per CPU.

5. The method of claim 4, wherein the second gateway is not available if one query per CPU has acquired the second gateway.

6. The method of claim 1, further comprising monitoring memory consumption of a third compilation of the query after having acquired the second gateway.

7. The method of claim 6, further comprising acquiring a third gateway for the query if the memory consumption of the third compilation exceeds a third gateway threshold and the third gateway is available.

8. The method of claim 7, wherein a number of queries as having acquired the third gateway is limited to one query per database system.

9. The method of claim 8, wherein the third gateway is available if less than one query per database system has acquired the third gateway.

10. The method of claim 9, further comprising sending a time out error message if the query is throttled for longer than a third gateway throttling time.

11. The method of claim 7, further comprising throttling the query if the memory consumption of the third compilation exceeds the third gateway threshold and the third gateway is not available.

12. The method of claim 11, wherein the third gateway is not available if one query per database system has acquired the third gateway.

13. The method of claim 1, further comprising dynamically varying the first gateway threshold and the second gateway threshold based on memory consumption of one or more components in the database system.

14. The method of claim 1, further comprising:
   resuming the first compilation if the first gateway becomes available before a first gateway time out threshold; and
   resuming the second compilation if the second gateway becomes available before a second gateway time out threshold.

15. The method of claim 1, further comprising sending a time-out error message if the first gateway does not become available before a first gateway time out threshold.

16. The method of claim 1, further comprising:
   monitoring memory consumption of a third compilation of the query after having acquired the second gateway;
   acquiring the first gateway for the query if the memory consumption of the third compilation falls below the second gateway threshold and the first gateway is available; and
   throttling the query if the memory consumption of the third compilation falls below the second gateway threshold and the first gateway is not available.

17. A method for compiling a query, comprising:
   monitoring memory consumption of a first compilation of the query;
   acquiring a first gateway if the memory consumption of the first compilation exceeds a first gateway threshold and the first gateway is available, wherein the first gateway is available if a number of queries as having acquired the first gateway is less than four queries per CPU;
   throttling the query if the memory consumption of the first compilation exceeds the first gateway threshold and the first gateway is not available, wherein the first gateway is not available if four queries per CPU have acquired the first gateway;
   compiling the query as having acquired the first gateway if the query acquired the first gateway before a first gateway throttling time expires;
   sending a time out error message if the query is throttled past the first gateway throttling time;

monitoring memory consumption of a second compilation of the query as having acquired the first gateway;
acquiring a second gateway for the query if the memory consumption of the second compilation exceeds a second gateway threshold and the second gateway is available, wherein the second gateway is available if a number of queries as having acquired the second gateway is less than one query per CPU;
throttling the query if the memory consumption of the second compilation exceeds a second gateway threshold and the second gateway is not available;
compiling the query as having acquired the second gateway if the query acquired the second gateway before a second gateway throttling time expired; and
sending the time out error message if the query is throttled past the second gateway throttling time.

18. The method of claim 17, further comprising:
monitoring memory consumption of a third compilation of the query as having acquired the second gateway;
acquiring a third gateway for the query if the memory consumption of the third compilation exceeds a third gateway threshold and the third gateway is available, wherein the third gateway is available if a number of queries as having acquired the third gateway is less than one query per database system;
throttling the query if the memory consumption of the third compilation exceeds a third gateway threshold and the third gateway is not available;
compiling the query as having acquired the third gateway if the query acquired the third gateway before a third gateway throttling time expired; and
sending the time out error message if the query is throttled past the third gateway throttling time.

19. A computer-readable medium having stored thereon computer-executable instructions which, when executed by a computer, cause the computer to:
monitor memory consumption of a first compilation of a query;
acquire a first gateway for the query if the memory consumption of the first compilation of the query exceeds a first gateway threshold and the first gateway is available, wherein the first gateway is available if a number of queries as having acquired the first gateway is less than four queries per CPU;
throttle the query if the memory consumption of the first compilation exceeds the first gateway threshold and the first gateway is not available;
monitor memory consumption of a second compilation of the query after having acquired the first gateway;
acquire a second gateway for the query if the memory consumption of the second compilation of the query exceeds a second gateway threshold and the second gateway is available, wherein the second gateway is available if a number of queries as having acquired the second gateway is less than one query per CPU; and
throttle the query if the memory consumption of the second compilation exceeds the second gateway threshold and the second gateway is not available.

20. The computer-readable medium of claim 19, further comprising computer-executable instructions which, when executed by a computer, cause the computer to:
monitor memory consumption of a third compilation of the query after having acquired the second gateway;
acquire a third gateway for the query if the memory consumption of the third compilation of the query exceeds a third gateway threshold and the third gateway is available, wherein the third gateway is available if a number of queries as having acquired the third gateway is less than one query per database system; and
throttle the query if the third compilation exceeds the third gateway threshold and the third gateway is not available.

* * * * *